United States Patent
Curran et al.

[15] 3,667,233
[45] June 6, 1972

[54] DUAL MODE SUPERSONIC COMBUSTION RAMJET ENGINE

[72] Inventors: Edward T. Curran; Frank D. Stull, both of Dayton, Ohio

[73] Assignee: The United States of America as represented by the Secretary of the Air Force

[22] Filed: Nov. 14, 1969

[21] Appl. No.: 870,545

[52] U.S. Cl. .................................. 60/270, 60/245, 60/261
[51] Int. Cl. ............................................................ F02k 7/08
[58] Field of Search ........................... 60/244, 245, 270, 261

[56] References Cited

UNITED STATES PATENTS 3,161,378   12/1964   Creasey et al. ............................ 60/270
3,199,291   4/1965   Kelley et al. .............................. 60/244
3,374,631   3/1968   Marks ....................................... 60/261
3,535,882   10/1970   Tizio et al. ................................ 60/270

*Primary Examiner*—Samuel Feinberg
*Attorney*—Harry A. Herbert, Jr. and Richard J. Killoren

[57] ABSTRACT

A supersonic ramjet engine having a fixed-geometry combustion chamber. The ramjet engine is operated in the subsonic mode by injecting fuel in fuel injectors located in a uniform cross-section portion of the combustion chamber and in the supersonic mode by injecting fuel in fuel injectors located upstream of the subsonic injectors in an adjacent expanding portion of the combustion chamber.

4 Claims, 5 Drawing Figures

INVENTORS
EDWARD T. CURRAN
FRANK D. STULL
BY
ATTORNEY
Richard J. Killoren
AGENT

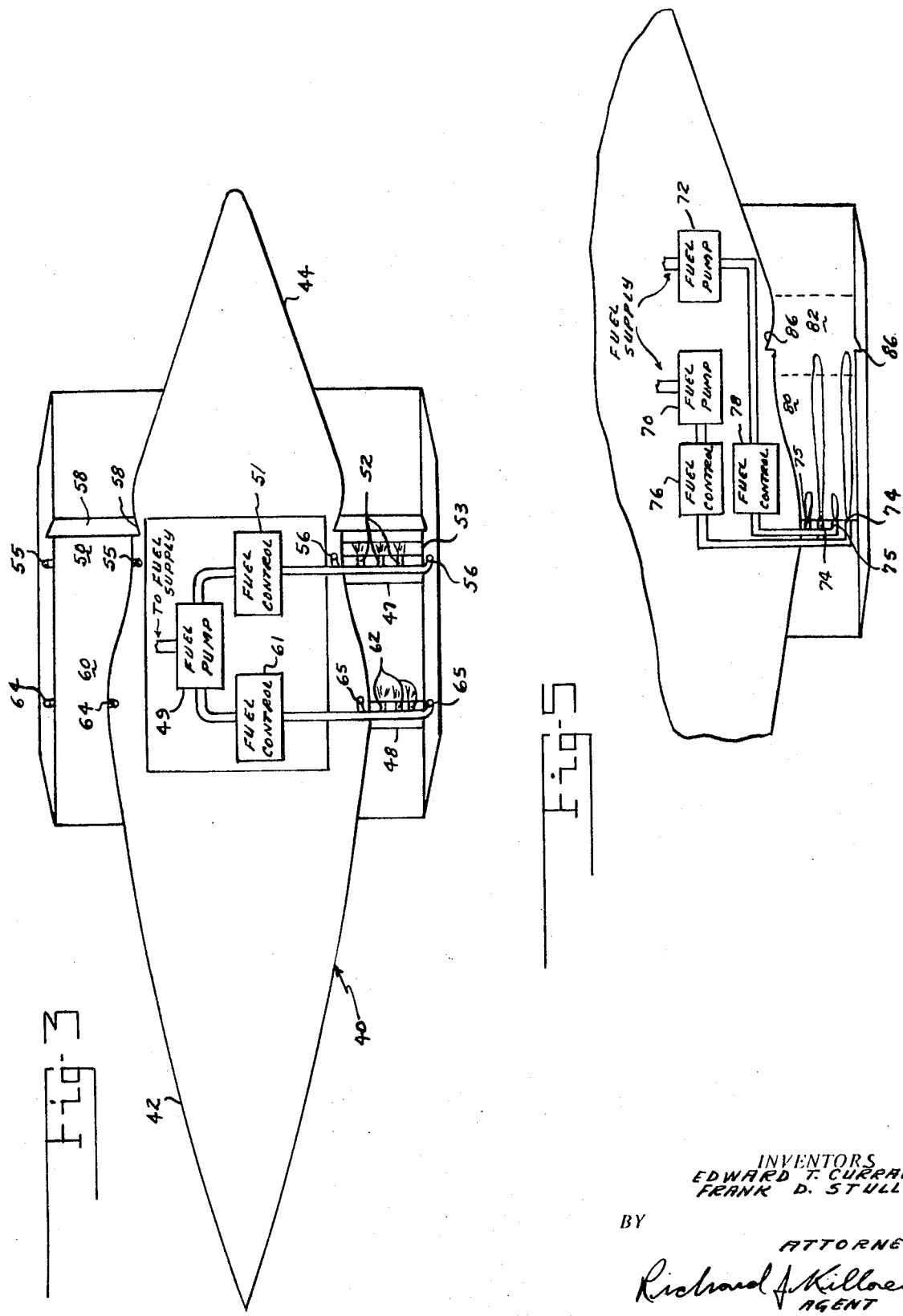

DUAL MODE SUPERSONIC COMBUSTION RAMJET ENGINE

BACKGROUND OF THE INVENTION

The supersonic combustion ramjet engine possesses the potential of high performance in the speed ranges Mach 8–25. However, operation of such engines at speeds substantially below Mach 8 has received little attention previously. Presumably this is because of two factors: (1) it is generally conceded on the basis of current component efficiencies, that subsonic combustion engines yield better performance at the lower speeds; and (2) the extension of supersonic combustion ramjet engine operation to lower speeds appears inherently difficult. However, acceleration of a supersonic combustion ramjet powered vehicle to the region of Mach 8 is a formidable problem. Acceleration to this speed by a turbo-accelerator engine is questionable unless a complex multimode operation is undertaken. It follows, therefore, that any significant reduction in the take-over speed of the supersonic combustion ramjet engine could provide a major simplification in the turbo-accelerator system with considerable benefit to the overall vehicle performance.

SUMMARY OF THE INVENTION

According to this invention use is made of the main supersonic ramjet engine duct for propulsion at lower speeds.

A combustor with a fixed geometry has one parallel combustion section with a substantially uniform cross section along its length. Fuel is injected into this section and the flame is stabilized on recessed flameholders. As the fuel burns it causes choked flow in this section which sends a shock wave upstream to convert the normal supersonic flow through the combustor to subsonic flow. For transition from subsonic mode to the supersonic mode, fuel is injected into a diverging section upstream of the parallel section which causes the shock to move downstream until it is ejected from the engine. In the final transition to supersonic mode, fuel is supplied only to the upstream injectors.

IN THE DRAWINGS

FIG. 3 is a schematic diagram partially in block form showing an annular configuration for the combustion chamber of FIG. 1;

FIG. 5 is a schematic diagram partially in block form of a modified fuel supply system for the device of FIG. 1.

BRIEF DESCRIPTION OF THE INVENTION

Figure 1:
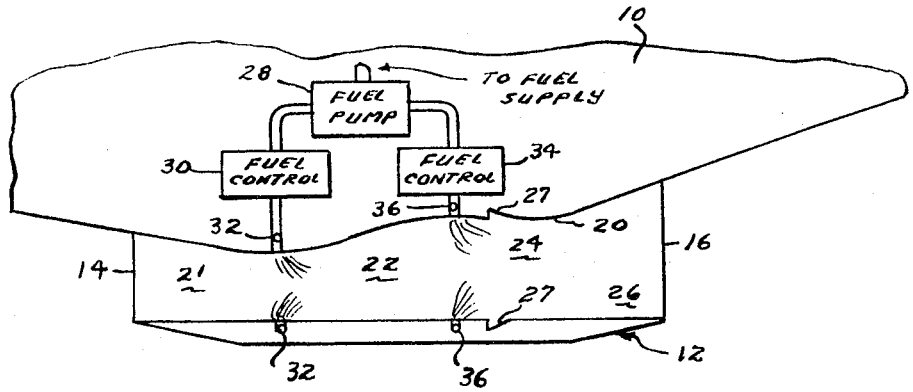
FIG. 1 is a schematic diagram partially in block form of a dual mode combustion chamber according to the invention.
Figure 2:
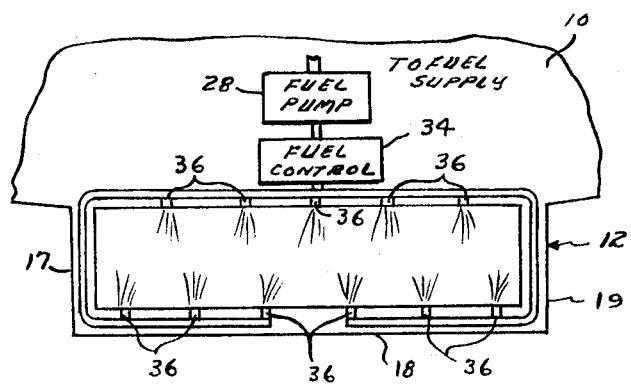
FIG. 2 is a schematic cross section of the device of FIG. 1 showing one possible arrangement of the fuel inlet jets.

Reference is now made to FIG. 1 of the drawing which shows a cutaway view of an aircraft 10 having a ramjet combustion engine 12 secured thereto. The combustion engine 12 has an inlet scoop 14 and an exhaust outlet 16. The walls 17, 18, and 19 of the combustion chamber, as shown in FIG. 2, are of substantially uniform thickness along their length with tapered streamlined leading and trailing edges.

The forth wall 20 of the combustion chamber is shaped to provide a converging inlet cowl passage 21, a diverging supersonic combustion section 22, a substantially uniform cross section subsonic combustion section 24 and an exit nozzle 26. Prior art pilot zone recesses 27 are provided to maintain combustion. Fuel is supplied to the supersonic combustion section from the fuel supply, not shown, through a fuel pump 28, a fuel control system 30, and a plurality of nozzles 32. Fuel is also supplied to the subsonic combustion section from fuel supply and pump 28 through a fuel control system 34 and a plurality of nozzles 36.

In the operation of the device, as in all ramjet devices, some means must be provided to attain aircraft speeds of between Mach 2 and Mach 3, where ramjet action can efficiently occur. At these speeds fuel is supplied to nozzles 36. Burning of the fuel in the uniform cross section combustion chamber 24 causes choked flow which sends a shock wave upstream of the flow to convert the supersonic flow to subsonic flow within the combustion chamber. As the speed of the aircraft increases to a speed between Mach 4 and Mach 5, fuel control 30 starts a flow of fuel to nozzles 32 as the fuel control 34 gradually decreases the fuel flow to nozzles 36. This causes the shock wave to gradually recede as fuel to nozzles 32 is increased and fuel flow is decreased to nozzles 36. At a speed of about Mach 8 fuel to nozzles 36 is further reduced and supersonic combustion now occurs throughout the divergent and parallel ducts. The expansion of the heated gases in expansion section 22 permits higher Mach speeds to be attained.

Figure 4:
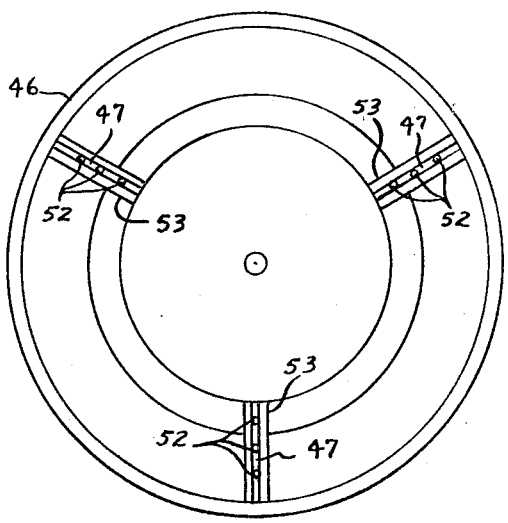
FIG. 4 is a schematic end view of the device of FIG. 3 from the exhaust end.

While the device thus far described shows a substantially rectangular shaped combustion chamber, other shapes may be used. For example, the combustion chamber may be annular in shape as shown in FIGS. 3 and 4. In this device the longitudinal cross section is substantially the same as in FIG. 1. A shaped central body 40 has an elongated inlet spike 42 and an exhaust plug 44. An annular member 46 is supported on the central body by means of struts 47 and 48, one each of which is shown in FIG. 3.

Fuel is supplied from the fuel pump 49 to the subsonic combustion chamber 50 through fuel control 51 and nozzles 52 in the struts 47. Low blockage conventional flameholders 43 are provided adjacent nozzles 52. Additional nozzles 55, supplied from fuel ducts 56, may be provided in the inner and outer walls between the struts to provide more uniform combustion. Conventional pilot zone recesses 58 are provided as in the device of FIG. 1.

Fuel is supplied from pump 49 to the supersonic combustion chamber 60 through fuel control 61 and nozzles 62 in struts 48. Additional nozzles 64 supplied from ducts 65 may also be provided between the struts 48. The operation of this device is substantially the same as the device of FIG. 1.

In some applications fuel could be supplied to both combustion sections in the manner shown in FIG. 5. In this device the combustion chamber may be the same as in FIG. 1 or FIG. 3. Separate pumps 70 and 72 supply the nozzles 74 and 75, respectively. A fuel control system 76 is provided between pump 70 and nozzles 74 and a fuel control system 78 is provided between the pump 72 and nozzles 75. Pump 70 is designed to provide a higher fuel pressure than pump 72. The stream of fuel from nozzles 74 is therefore sprayed through the supersonic combustion chamber 80 with a high velocity without much mixing and then into the subsonic chamber 82 where mixing and combustion takes place. Recess pilot zones 86 are provided as in the devices of FIGS. 1 and 3.

Fuel is supplied at a lower velocity into chamber 80 from nozzles 75. Fuel controls 76 and 78 control the fuel flow to nozzles 74 and 75 to provide operation similar to that described with respect to FIG. 1.

By changing the pumping pressure in a single pump, one pump and fuel control could be used for all of the nozzles in the device of FIG. 5 with the fuel being gradually moved from combustion chamber 82 to chamber 80 as the speed increases.

The fuel control systems in any of the devices described above may be controlled manually by the pilot or automatically from the output of a programmer in response to speed responsive apparatus.

Other fuel injector systems than those described may be provided. Also prior art stepped pilot zones may be used in certain applications and other combustor geometries than those shown may be used.

There is thus provided a dual-mode combustion system for a ramjet engine to permit operation in the subsonic or the supersonic modes.

We claim:

1. A supersonic combustion ramjet engine, comprising: a combustion chamber having an inlet cowl section; a first combustion section having a substantially uniform cross section along its length; a second combustion section diverging in the direction of flow between the inlet and the uniform section and a divergent exit section; a first means for selectively directing a flow of fuel into said first combustion section; a second means for selectively directing a flow of fuel into the second combustion section and flameholder means in said first combustion section.

2. The device as recited in claim 1 wherein said combustion chamber is formed by three substantially straight wall members having streamlined inlet and outlet portions and a fourth chamber shaping wall member providing the different sections of the combustion chamber.

3. The device as recited in claim 1 wherein said combustion chamber is formed of a substantially uniform annular member having streamlined inlet and outlet portions and a central body means for forming the different sections of the combustion chamber.

4. The device as recited in claim 1 wherein said means for directing a flow of fuel into said second combustion section includes a plurality of nozzles adjacent the upstream end of the second combustion section and means for providing a low velocity fuel spray from said nozzles and wherein said means for directing a fuel flow into said first combustion section includes a plurality of nozzles adjacent said first nozzles and means for providing a high velocity fuel spray through the second combustion section into the first combustion section.

* * * * *